United States Patent [19]

Yoshida

[11] 4,328,990

[45] May 11, 1982

[54] SUN-ROOF STRUCTURES FOR AUTOMOBILE BODIES

[75] Inventor: Rihee Yoshida, Hiroshima, Japan

[73] Assignee: Toyo Kogyo Co. Ltd., Hiroshima, Japan

[21] Appl. No.: 121,971

[22] Filed: Feb. 15, 1980

[30] Foreign Application Priority Data

Feb. 19, 1979 [JP] Japan .............................. 54-20039[U]

[51] Int. Cl.³ .............................................. B60J 7/18
[52] U.S. Cl. ..................................... 296/222; 296/216
[58] Field of Search ............... 296/216, 210, 221, 222, 296/223, 224

[56] References Cited

U.S. PATENT DOCUMENTS

| | | | |
|---|---|---|---|
| 3,016,263 | 1/1962 | Rehmann | 296/222 |
| 3,333,889 | 8/1967 | Golde | 296/222 |
| 3,863,979 | 2/1975 | Bienert | 296/222 |
| 4,018,476 | 4/1977 | Lutz et al. | 296/222 |
| 4,159,144 | 6/1979 | Ehlen et al. | 296/222 |

FOREIGN PATENT DOCUMENTS 695609  9/1965  Italy ................................... 296/222

Primary Examiner—Joseph F. Peters, Jr.
Assistant Examiner—Ross Weaver
Attorney, Agent, or Firm—Fleit & Jacobson

[57] ABSTRACT

A sun-roof structure of an automobile body including a roof panel having a roof opening which is defined by a downwardly extending flange. The flange is comprised of an upper seat portion and a lower marginal portion. A sliding panel is adapted to close the roof opening and has a weather strip along its periphery so as to be engaged with the seat portion of the flange. An auxiliary panel has an inboard end formed with a downwardly extending flange which is welded to the marginal portion. The outboard edge portion of the auxiliary panel is secured to the inner surface of the roof panel. The guide rail for the sliding panel is secured to the auxiliary panel.

7 Claims, 2 Drawing Figures

F I G. 1
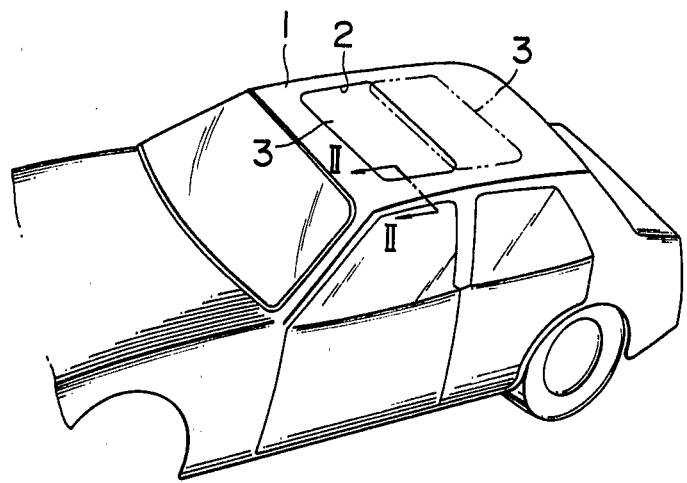
F I G. 2
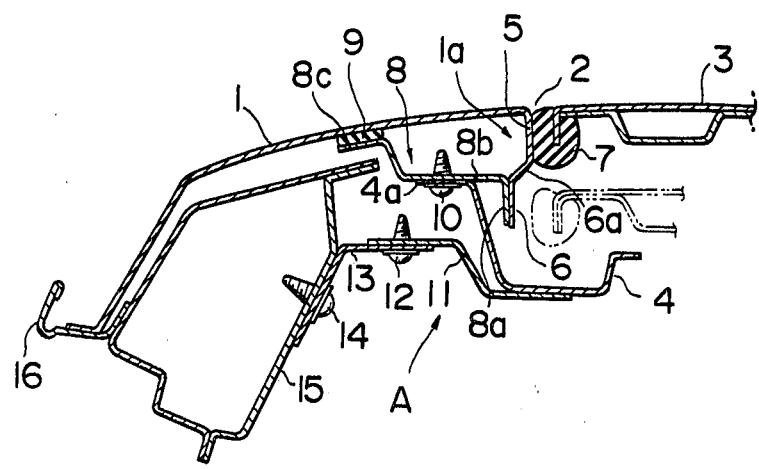

SUN-ROOF STRUCTURES FOR AUTOMOBILE BODIES

The present invention relates to automobile bodies having sun-roof structures and more particularly to sliding type sun-roof structures.

Conventionally, it has been known to provide an automobile body with a roof opening adapted to be closed by a sliding panel which is movable in fore and aft directions. In one known type of sliding roof structures, the sliding panel is shifted from a closed position to an open position by being at first moved downwardly and then rearwardly. The roof structure of the body therefore includes a guide rail along each side of the roof opening to guide the movement of the sliding panel. The roof opening is defined by a downwardly bent flange formed along each side of the opening and the sliding panel is provided along each edge with a weather strip or sealing member which is adapted to be water-tightly engaged with the flange in the roof structure.

Structurally, the downwardly bent flange in the roof panel is secured such as by spot welding to a connecting panel at an inboard edge portion thereof. For the purpose, the inboard edge portion of the connecting panel is formed with a flange which is adapted to be attached to the downward flange in the roof panel. The connecting panel is further secured such as by welding along the outboard edge portion to a roof rail which is generally of a closed cross-section and extends along the outboard edge portion of the roof panel. The guide rail for the sliding roof panel is secured such as by screws to the connecting panel to be supported thereby.

In the conventional structure, inconveniencies have been encountered in that a substantial distance has to be maintained between the roof rail and the downward flange in the roof panel which is to be welded to the flange on the inboard edge portion of the connecting panel, in order to avoid interference between a welding tool and the roof rail. Thus, the width of the roof opening has to be limited. Further, due to possible dimensional errors in the roof and connecting panels, distortions are sometimes produced after welding and the appearance of the body is therefore adversely affected. Another disadvantage in this type of structure is that, as the sliding roof panel is vertically moved for operation, the sealing members on the sliding roof panel may possibly be damaged by the edges of the downward flanges of the roof panel. The structure is further disadvantageous in respect of dimensional accuracy and of manufacturing cost because it is required to weld the connecting panel to the roof rail in order to ensure a desired rigidity.

In another known type of sliding roof structure, the guide rail for the sliding panel has an auxiliary panel which is welded thereto at the outboard side thereof and connected, for example, by screws to a connecting panel which is in turn connected with the roof rail. The downward flange formed in the roof panel for defining a roof opening is attached with a further auxiliary panel which is in turn adhesively attached to the upper edge portion of the guide rail.

In this type of structure, as in the aforementioned type, there are also problems of distortion due to dimensional errors and of damages in the sealing members on the sliding roof panel. The structure is further disadvantageous in that it requires an increased number of parts and the manufacturing cost is accordingly increased.

It is therefore an object of the present invention to provide a sliding type sun-roof structure in which an increased width of roof opening can be provided.

Another object of the present invention is to provide a sun-roof structure which can eliminate the problems of distortion and damages in the sealing members on the sliding panel.

According to the present invention, the above and other objects can be accomplished by a sun-roof structure for an automobile body comprising a roof panel formed with a roof opening defined by a peripheral edge portion including opposite side edges, said roof panel being formed along said peripheral edge portion with a downwardly directed flange including an upper seat portion and a lower welding marginal portion, said marginal portion being retreated with respect to the seat portion in a direction opposite to the roof opening, auxiliary panel means disposed along said peripheral edge portion and having an inboard edge portion formed with a downwardly extending flange which is welded to said marginal portion of the roof panel, guide rail means extending beneath the side edges of the roof opening and secured to the auxiliary panel means, a sliding panel having a peripheral edge provided with a sealing member which is adapted to be engaged with said seat portion, said sliding panel being adapted to be guided by said guide rail means. According to the features of the present invention, the welding marginal portion of the flange in the roof panel is retreated with respect to the seat portion so that it is possible to prevent the sealing member from being damaged by the edge of the flange. Further, any dimensional error can be absorbed by the marginal portion and does not have any effect on the seat portion. Therefore, there is no adverse effect on the appearance of the roof panel.

In a preferable aspect of the present invention, the auxiliary panel means has an outboard peripheral edge portion which is secured to the roof panel to form a structure of a closed cross-section around the roof opening. The rigidity of the peripheral portion of the roof opening can therefore be increased and it becomes possible to increase the widthwise dimension of the roof opening. The outboard peripheral edge portion of the auxiliary panel may preferably be secured to the roof panel by means of an adhesive but any other securing technique may be employed. In order to provide a further rigidity, the guide rail means may be connected with roof rail means which extends longitudinally along the outboard edge portions of the roof panel.

The above and other objects and features of the present invention will become apparent from the following descriptions of a preferred embodiment taking reference to the accompanying drawings, in which:

FIG. 1 is a perspective view of an automobile having a sun-roof structure to which the present invention can be applied; and, FIG. 2 is a sectional view taken substantially along the line II—II in FIG. 1.

Referring now to the drawings, particularly to FIG. 1, the automobile body shown therein includes a roof panel 1 having a substantially rectangular roof opening 2 which is adapted to be closed by a sliding panel 3. The sliding panel is movable rearwardly to an open position shown by a phantom line.

Referring now to FIG. 2, there is shown a roof structure A embodying the features of the present invention.

The roof opening 2 is shown as being defined by a downwardly extending peripheral flange 1a which comprises an upper seat portion 5 and a lower welding marginal portion 6. Between the seat portion 5 and the marginal portion 6, there is formed a shoulder portion 6a so that the marginal portion 6 is retreated with respect to the seat portion 5 in a direction opposite to the opening 2. The sliding panel 3 is provided at its peripheral edge portion with a weather strip or sealing member 7 which is adapted to be brought into a water-tight engagement with the seat portion 5 of the flange 1a. It should be noted that the seat portion 5 defines the periphery of the roof opening 2 which is slightly narrower than the outer contour of the sealing member 7 so that the sealing member 7 is engaged with the seat portion 5 with a slightly compressed condition.

The roof structure A further includes an auxiliary panel 8 which has a flange 8a downwardly extending from the inboard end of a flat horizontal portion 8b. The panel 8 has an outboard end portion which is upwardly stepped with respect to the portion 8b to provide a horizontal flange 8c. The downward flange 8a is secured to the marginal portion 6 of the flange 1a by means of a spot welding and the horizontal flange 8c is secured to the inner surface of the roof panel 1 by means of an adhesive 9. Thus, there is formed a rigid structure of closed cross-section around the opening 2.

A guide rail 4 is provided beneath the downward flange 1a for guiding the movements of the sliding panel 3. The guide rail 4 is formed at the outboard edge portion with a horizontal flange 4a which is secured to the horizontal portion 8b by means of screws 10. The guide rail 4 is further connected with a connecting panel 11 which is welded thereto along the inboard edge portion. The outboard edge portion of the connecting panel 11 is connected by means of screws 12 with an angle member 13 which is in turn connected by means of screws 14 with a roof rail 15. The roof rail 15 is of a closed cross-section and extends longitudinally along each side edge portion of the roof panel 1. A rain rail 16 may be provided at each side of the roof panel 1 as shown in FIG. 2.

It will be readily understood that the configuration of the downward flange 1a defining the roof opening 2 provides an advantage in that the sealing member 7 on the sliding panel 3 will not hit against the lower edge of the marginal portion 6 during the vertical movement. Therefore, it is possible to eliminate any possibility of the sealing member 7 being damaged by the edge of the marginal portion 6. The marginal portion 6 of the flange 1a and the flange 8a in the auxiliary panel 8 can readily be welded together before the guide rail 4 is installed. If there is any dimensional errors in the roof panel 1 and the auxiliary panel 8, there may be produced distortions in the marginal portion 6 when it is welded to the auxiliary panel 8. However, such distortions can be absorbed by the marginal portion 6 and the shoulder portion 6a and there will be no effect on the seat portion 5. Thus, an improved weather-tight seal can be ensured between the roof panel 1 and the sliding panel 3. Further, the distortions in the marginal portion 6 do not have any adverse effect on the appearance of the roof panel 1. It should further be noted that, since a rigid structure is provided along the periphery of the roof opening, it is possible to increase the width of the opening.

The invention has thus been shown and described with reference to a specific embodiment, however, it should be noted that the invention is in no way limited to the details of the illustrated structures but changes and modifications may be made without departing from the scope of the appended claims.

I claim:

1. A sun-roof structure for an automobile body comprising a roof panel formed with a roof opening defined by a peripheral edge portion including opposite side edges, said roof panel being formed along said peripheral edge portion with a downwardly directed flange including an upper seat portion defined by a substantially vertical surface of said downwardly directed flange and a lower welding marginal portion, said marginal portion being retreated with respect to the seat portion in a direction opposite to the roof opening, auxiliary panel means disposed along said peripheral edge portion and having an inboard edge portion formed with a downwardly extending flange which is welded to said marginal portion of the roof panel, guide rail means extending beneath the side edges of the roof opening and secured to the auxiliary panel means, a sliding panel having a peripheral edge provided with a sealing member which is adapted to be engaged with said seat portion, said sliding panel being adapted to be guided by said guide rail means.

2. A sun-roof structure in accordance with claim 1 in which said auxiliary panel means has an outboard peripheral edge portion which is secured to the roof panel to form a structure of a closed cross-section around the roof opening.

3. A sun-roof structure in accordance with claim 2 in which the outboard peripheral edge portion of the auxiliary panel means is secured to the roof panel by means of an adhesive.

4. A sun-roof structure in accordance with claim 1 in which said auxiliary panel means has a horizontal portion contiguous with said downwardly extending flange, said horizontal portion being formed at outboard edge portion with a stepped portion to provide a horizontal flange which is secured to the roof panel.

5. A sun-roof structure in accordance with claim 1 in which said guide rail means is connected with roof rail means which is of a closed cross-section and extends longitudinally along each side portion of the roof panel.

6. A sun-roof structure for an automobile body comprising a roof panel formed with a roof opening defined by a peripheral edge portion including opposite side edges, said roof panel being formed along said peripheral edge portion with a downwardly directed flange including an upper seat portion defined by a substantially vertical surface of said downwardly directed flange and a lower welding marginal portion, said marginal portion being retreated with respect to the seat portion in a direction opposite to the roof opening, auxiliary panel means disposed along said peripheral edge portion and having an inboard edge portion formed with a downwardly extending flange which is welded to said marginal portion of the roof panel, guide rail means secured to the body so as to extend beneath the side edges of the roof opening, a sliding panel having a peripheral edge provided with a sealing member which is adapted to be engaged with said seat portion, said sliding panel being adapted to be guided by said guide rail means.

7. A sun-roof structure in accordance with claim 6 in which said auxiliary panel has an inboard portion adapted to be fitted to the marginal portion of the downwardly directed flange and an outboard portion extending in a direction opposite to the roof opening.

* * * * *